United States Patent [19]

Mansell

[11] 3,725,816
[45] Apr. 3, 1973

[54] FAN GEOMETRY MIXING LASER

[75] Inventor: Dennis N. Mansell, Palos Verdes, Calif.

[73] Assignee: The United States of America as represented by the Secretary of the Air Force

[22] Filed: Apr. 28, 1972

[21] Appl. No.: 248,420

[52] U.S. Cl. ..................................331/94.5, 330/4.3
[51] Int. Cl. ...............................................H01s 3/22
[58] Field of Search .......................331/94.5; 330/4.3

[56] References Cited

UNITED STATES PATENTS

| | | |
|---|---|---|
| 3,571,747 | 3/1971 | Bronfin ..............................331/94.5 |
| 3,577,096 | 5/1971 | Bridges..............................331/94.5 |
| 3,666,982 | 5/1972 | Wiegand ............................331/94.5 |
| 3,671,882 | 6/1972 | Cool....................................331/94.5 |
| 3,681,710 | 8/1972 | Lary et al. ..........................331/94.5 |

Primary Examiner—William L. Sikes
Attorney—Harry A. Herbert, Jr. et al.

[57] ABSTRACT

A mixing laser is fed by a plurality of glass discharge tubes arranged in a fan configuration each tube being fed by a helium source and a nitrogen source. The nitrogen source is electrically excited by a DC power supply and sent to a vacuum mixing chamber where the gases are mixed with cold carbon dioxide through bleed bars.

4 Claims, 2 Drawing Figures

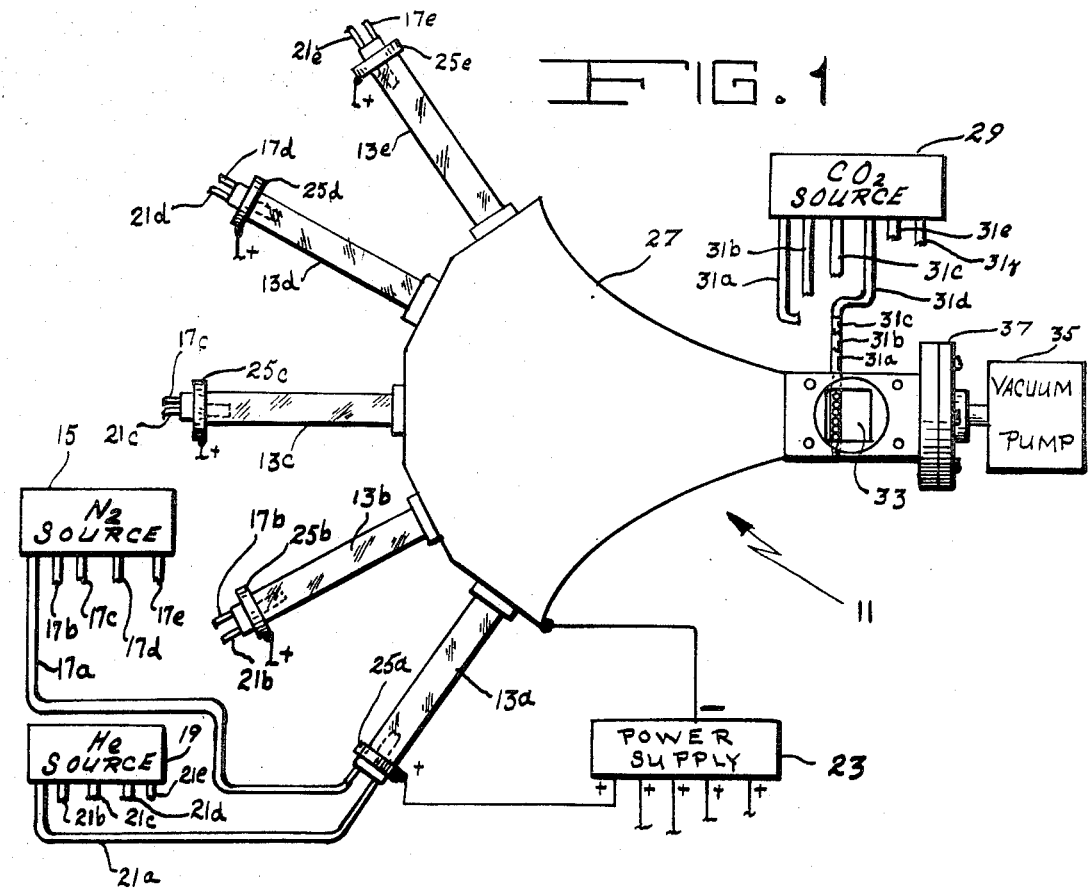
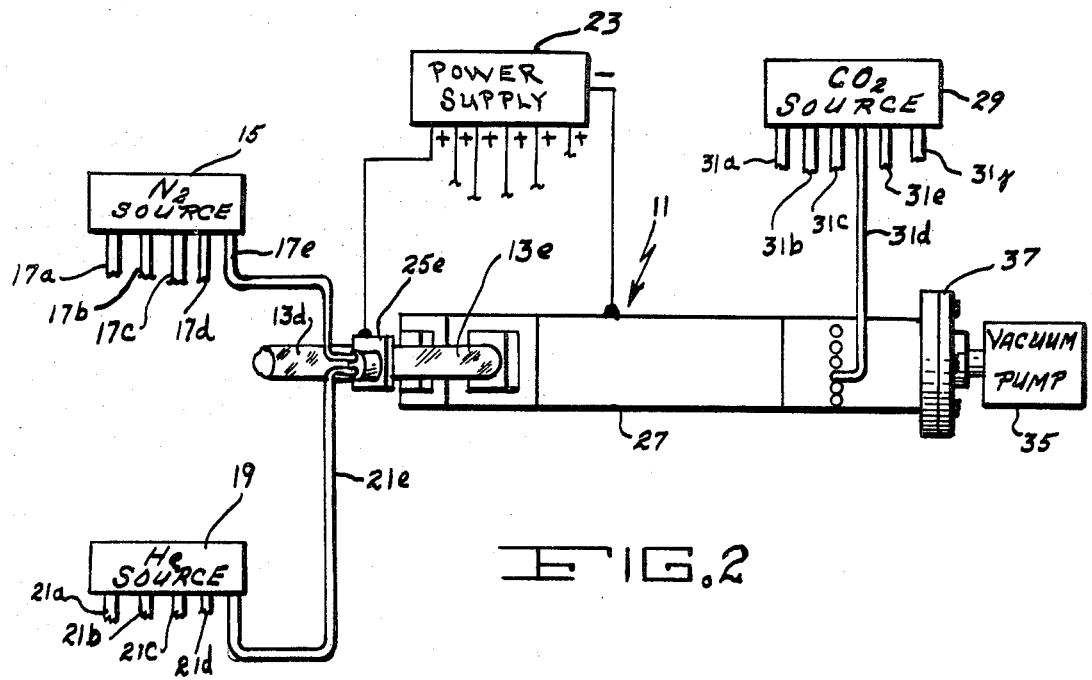

FAN GEOMETRY MIXING LASER

BACKGROUND OF THE INVENTION

This invention relates to lasers, and more particularly to fan geometry mixing lasers.

In the past there has been the problem of constructing lasers with high power outputs. This problem could be approached by increasing the laser's dimension. However, using this technique causes an increase in heat that could damage the optical components.

The invention solves the problem of scaling carbon dioxide mixing lasers to high powers and still keeping the length within reasonable bounds. It also allows the use of larger diameter optics which has been a problem in other mixing lasers. This decreases drastically the flux density and corresponding heating problems.

SUMMARY OF THE INVENTION

Nitrogen gas is electrically excited in five glass discharge tubes and allowed to flow and converge into a vacuum cavity designed to smooth the flow and increase the gas velocity. Cold carbon dioxide is added by means of vertical bleed bars and allowed to mix with the excited nitrogen. A 3 inches × 3 inches × 4 inches volume of excited carbon dioxide is produced, and this volume is the heart of the laser system.

This laser produces a large cross-sectional area gain region which allows large diameter optics to be used. No limit is imposed on the number of discharge tubes, as sections can be jointed side to side for very high powered devices. Careful injection of carbon dioxide produces a relatively square gain cross section rather than an oblong cross section in similar devices.

It is an object of the invention to provide a novel and improved gas laser.

It is therefore another object to provide a gas laser capable of delivering very high power.

It is still another object to provide a gas laser having a large cross section area which allows large diameter optics to be used.

It is yet another object to provide a gas laser having a relatively square cross section rather than an oblong cross section.

These and other objects, features and advantages of the invention will become more apparent from the following description taken in connection with the illustrative embodiment in the accompanying drawings.

DESCRIPTION OF THE DRAWINGS

FIG. 1 is partially a side view pictorial and partially a block diagram of an embodiment of the invention; and FIG. 2 is a top view of the pictorial portion of that shown in FIG. 1.

DETAILED DESCRIPTION OF THE PREFERRED EMBODIMENT

Referring to FIGS. 1 and 2, there is shown mixing laser assembly 11 in which are connected discharge tubes 13a–13e that can be made of any electrically insulating material but preferably of glass, and in a preferred embodiment the dimensions would be 2 inches in diameter and 18 inches in length. Nitrogen gas from nitrogen source 15 is injected in tubes 13a–13 by conduits 17a–17e. Helium gas from helium source 19 is injected into tubes 13a–13e via conduits 21a–21. The nitrogen gas is electrically excited by connecting one terminal of DC power supply 23 to electrically conducting flanges 25a–25e and the other terminal is connected to the chassis of vacuum cavity 27 which is a common or ground terminal with respect to flanges 25a–25e. A preferred power supply would be 10–20 kilovolts at 500 milliamperes.

The gases are allowed to flow and converge into vacuum cavity 27. This smooths the flow and increases the gas velocity. Cold carbon dioxide from carbon dioxide source 29 is added by means of vertical bleed bars 31a–31f and allowed to mix with the excited nitrogen gas. An amount of excited carbon dioxide is produced in a volume such as 3 inches × 3 inches × 4 inches which is shown as 33. The preferred mixture of gases is 2 $N_2$: 1 $CO_2$: 1 He and mixed in a pressure of 20–60 torr. This vacuum is obtained from vacuum pump 35 which is attached to chassis 27 by flange 37 and is operated at at least 3,000 CFM.

What is claimed is:

1. A laser assembly comprising:
   a. a plurality of discharge tubes each tube having
      1. means for injecting nitrogen gas into the tube,
      2. means for electrically exciting the nitrogen,
   b. a mixer chamber fed by the plurality of discharge tubes; and
   c. means for injecting carbon dioxide into the chamber creating excited carbon dioxide.

2. A laser assembly according to claim 1 wherein the mixing chamber is evacuated and the discharge tubes are made of glass.

3. A laser assembly according to claim 2 wherein the means for injecting carbon dioxide comprises a plurality of bleed bars.

4. A laser assembly according to claim 3 where the means for electrically exciting the nitrogen is a DC power supply the terminals thereof being connected to each extreme of the discharge tubes.

* * * * *